US012336645B2

(12) United States Patent
Wu

(10) Patent No.: US 12,336,645 B2
(45) Date of Patent: Jun. 24, 2025

(54) ACOUSTIC SEAT

(71) Applicant: Genova INC, Diamond Bar, CA (US)

(72) Inventor: Peng Wu, Shanghai (CN)

(73) Assignee: Genova INC, Diamond Bar, CA (US)

( * ) Notice: Subject to any disclaimer, the term of this patent is extended or adjusted under 35 U.S.C. 154(b) by 148 days.

(21) Appl. No.: 18/204,394

(22) Filed: Jun. 1, 2023

(65) Prior Publication Data

US 2024/0398124 A1 Dec. 5, 2024

(30) Foreign Application Priority Data

Apr. 1, 2022 (CN) ......................... 202220744666.8

(51) Int. Cl.
*A47C 7/72* (2006.01)
*H04R 1/02* (2006.01)
*H04R 5/02* (2006.01)

(52) U.S. Cl.
CPC ............ *A47C 7/727* (2018.08); *H04R 1/025* (2013.01); *H04R 5/023* (2013.01); *H04R 2420/07* (2013.01)

(58) Field of Classification Search
CPC ....................................................... A47C 7/727
USPC .... 297/188.08, 188.12, 188.13, 188.2, 217.4
See application file for complete search history.

(56) References Cited

U.S. PATENT DOCUMENTS 1,704,415 A * 3/1929 Wenegrat ............... A47C 7/725 297/217.6
5,624,156 A * 4/1997 Leal ....................... B60N 2/286 5/904
5,641,197 A * 6/1997 Springmann ............ A47C 7/66 248/512
6,629,722 B1 * 10/2003 Tang ...................... A47C 4/286 297/188.2
6,945,598 B2 * 9/2005 Furukawa ................ A47C 7/62 297/217.3
7,229,131 B2 * 6/2007 Chen ...................... A47C 7/727 297/16.2
7,812,567 B2 * 10/2010 Shen ..................... H02J 7/0044 320/113
7,963,592 B1 * 6/2011 Stanley ................ A47C 20/026 297/31
8,388,058 B2 * 3/2013 Krasley .................. A47C 7/624 297/188.2
8,465,090 B1 * 6/2013 O'Connor ............. A47C 4/286 297/188.2

(Continued)

*Primary Examiner* — Robert Canfield

(74) *Attorney, Agent, or Firm* — Bayramoglu Law Offices LLC

(57) ABSTRACT

An acoustic seat includes: a speaker arranged on one side or two sides of an interior of an upper end of a backrest; a pocket arranged on a side of a front end of a cushion side lug, where a pluggable end of a cable from the speaker is downward in the backrest to enter the cushion side lug and extends into the pocket; and a Bluetooth® receiver pluggably connected to the pluggable end and configured to be placed in the pocket or taken out of the pocket randomly for different operations. According to the acoustic seat, the pocket for placing the Bluetooth® receiver is arranged on a side of a cushion. The speakers are arranged on the two sides of the top of the backrest and adjacent to ears. With internal wiring in the seat, the Bluetooth® receiver and the speakers are connected.

8 Claims, 3 Drawing Sheets

(56) References Cited

U.S. PATENT DOCUMENTS

| | | | | | |
|---|---|---|---|---|---|
| 8,789,884 | B1 * | 7/2014 | Edelman | A47C 7/622 | |
| | | | | 297/188.13 | |
| 8,864,221 | B1 * | 10/2014 | Delvilla | A47C 7/5066 | |
| | | | | 297/180.12 | |
| 9,185,988 | B1 * | 11/2015 | Sanchez | A47C 7/72 | |
| 9,685,060 | B2 * | 6/2017 | Mantsvetov | G08B 21/02 | |
| 9,795,224 | B2 * | 10/2017 | George, II | A47C 7/624 | |
| 9,973,021 | B2 * | 5/2018 | Leabman | H02J 50/402 | |
| 10,291,066 | B1 * | 5/2019 | Leabman | H02J 50/20 | |
| 10,479,235 | B1 * | 11/2019 | Stroud | B60N 2/879 | |
| D893,656 | S * | 8/2020 | Azar Cohen | D21/803 | |
| 11,357,332 | B2 * | 6/2022 | Chalfin | H04R 1/2834 | |
| 11,490,197 | B1 * | 11/2022 | Wu | A63F 13/98 | |
| 2008/0100107 | A1 * | 5/2008 | Paslawski | A47C 4/286 | |
| | | | | 297/217.4 | |
| 2008/0122269 | A1 * | 5/2008 | Tatlock | A61B 5/6887 | |
| | | | | 297/188.2 | |
| 2009/0268923 | A1 * | 10/2009 | Li | H04N 5/775 | |
| | | | | 381/77 | |
| 2013/0328362 | A1 * | 12/2013 | Miller | A47C 7/62 | |
| | | | | 297/188.2 | |
| 2017/0340122 | A1 * | 11/2017 | Anderson | A47C 7/72 | |
| 2020/0383479 | A1 * | 12/2020 | Lalaoua | A47C 7/705 | |
| 2021/0345786 | A1 * | 11/2021 | Peng | A47C 1/0303 | |
| 2023/0179918 | A1 * | 6/2023 | Park | A47C 7/72 | |

* cited by examiner

ACOUSTIC SEAT

CROSS REFERENCE TO THE RELATED APPLICATIONS

This application is based upon and claims priority to Chinese Patent Application No. 202220744666.8, filed on Apr. 1, 2022, the entire contents of which are incorporated herein by reference.

TECHNICAL FIELD

The present invention relates to the technical field of seats, and in particular to an acoustic seat.

BACKGROUND

Seats are provided with a backrest and sometimes with an armrest. At present, most seats have a single function, which are only used by people for sitting and lying, and lack entertainment.

With the development of society, higher requirements are being imposed on seats. In the fast-paced and fast-developing era, people are fond of music for relaxation when lying on seats, and there emerges a music seat. However, concerning existing music seats, a speaker is typically arranged on a top of the backrest. For the sake of wire saving or wiring, a receiver with a battery is arranged on the rear side of the backrest. This makes operation troublesome, and greatly reduces the user experience.

The patent CN202820426U discloses a music seat, which belongs to the technical field of items in daily use. The music seat includes a seat, a small speaker, a volume controller, an earphone, and a device box. The small speaker is fixed on a middle of an upper portion of a backrest and at a position exactly contacting a head. The volume controller is fixed on a left of a top of the backrest. The volume controller is connected to the small speaker and the earphone. The device box is fixed adjacent to the volume controller. However, this structure is still hard to be operated.

SUMMARY

In view of defects in the prior art, an objective of the present invention is to provide an acoustic seat.

The present invention provides an acoustic seat, including:

- a speaker arranged on one side or two sides of an interior or an exterior of an upper end of a backrest;
- a pocket arranged on a side of a front end of a cushion side lug, where a pluggable end of a cable from the speaker is downward in the backrest to enter the cushion side lug and extends into the pocket; and
- a Bluetooth® receiver pluggably connected to the pluggable end and configured to be placed in the pocket or taken out of the pocket randomly for different operations. The Bluetooth receiver is a wireless receiver that is configured to receive and process wireless signals.

Preferably, the Bluetooth® receiver is provided therein with a power battery and has a charging port, and the charging port is electrically connected to the battery.

Preferably, the cable has a length margin, and is configured to be pulled out of the pocket or hidden in the pocket.

Preferably, the cable includes a first wire in the backrest and a second wire in the cushion side lug; and

- the first wire and the second wire are connected by a connecting plug.

Preferably, the pocket is a flexible structure.

Preferably, the pocket is provided with a flap. One end of the flap is connected to an inner side of a top of the pocket, and the other end of the flap is configured to cover an opening of the pocket and be connected to an outer side of the top of the pocket.

Preferably, the other end of the flap is connected to the outer side of the top of the pocket by a button, magnetic attraction, and the like.

Preferably, an inner side of the pocket is attached to a side of the cushion side lug by a magic tape or sewing.

Preferably, through holes for allowing the pluggable end to pass through are formed in an inner side of the pocket and the side of the cushion side lug, respectively.

Preferably, the speaker is bonded or detachably mounted in the backrest.

Compared with the prior art, the present invention has the following beneficial effects:

1. The pocket for placing the Bluetooth® receiver is arranged on a side of a cushion. The speakers are arranged on the two sides of the top of the backrest and adjacent to ears. With internal wiring in the seat, the Bluetooth® receiver and the speakers are connected. Therefore, the present invention makes the Bluetooth® receiver taken out and placed more conveniently, and is aesthetically-pleasing through the internal wiring. Meanwhile, the present invention has a good sound effect, and greatly improves a user experience.

2. The cable includes two segments that are connected by the connecting plug. This prevents the problem of hard assembly for the long cable, and makes the operation more convenient.

3. The pocket with a flap is arranged on the side of the cushion, such that the Bluetooth® receiver and excessive cable are hidden in the pocket. Therefore, the present invention is aesthetically-pleasing.

BRIEF DESCRIPTION OF THE DRAWINGS

Other features, objectives, and advantages of the present invention will become more apparent by reading the detailed description of non-limiting embodiments with reference to the following accompanying drawings.

In the figures.

1: speaker

11: cable

111: pluggable end

112: connecting plug

2: pocket

21: flap

3: Bluetooth® receiver, 31: power battery, 32: pluggable port, 33: charging port

101: backrest

102: cushion
1021: cushion side lug

DETAILED DESCRIPTION OF THE EMBODIMENTS

The following describes the present invention in detail in conjunction with particular embodiments. The following embodiments will be conducive to further understanding of the present invention by a person of ordinary skill in the art, but does not limit the present invention in any form. It should be noted that several variations and improvements can also be made by a person of ordinary skill in the art without departing from the conception of the present invention. These variations and improvements shall fall within the protection scope of the present invention.

Figure 1:
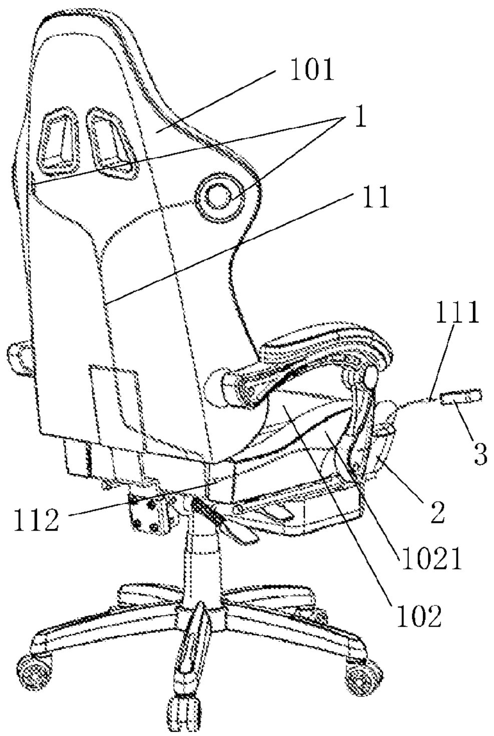
FIG. 1 is a schematic structural view for wiring of a seat according to the present invention.
Figure 2:
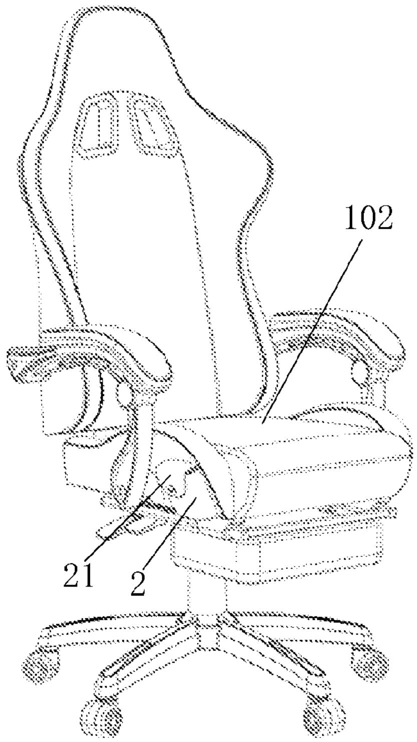
FIG. 2 is a schematic structural view when a pocket is covered by a flap according to the present invention.
Figure 3:
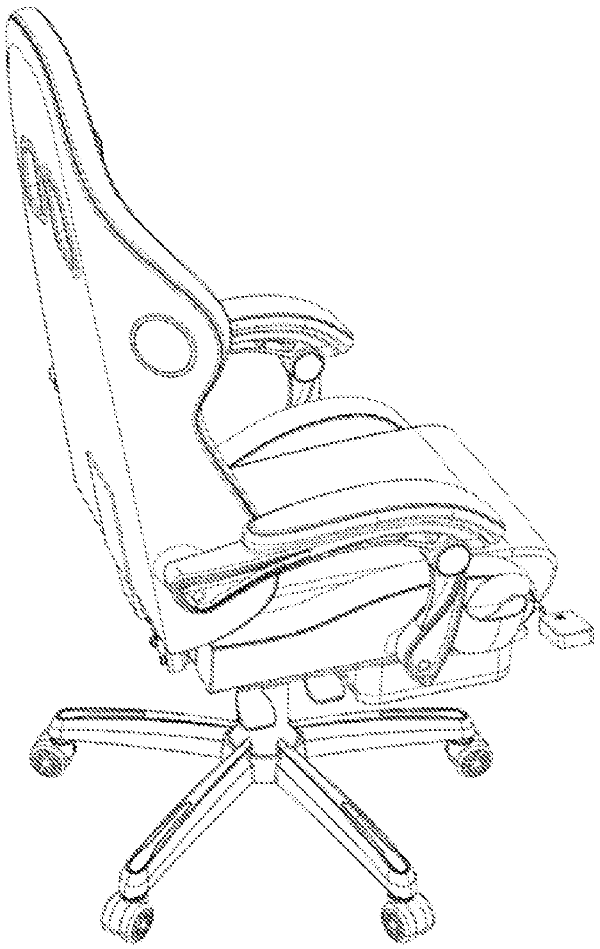
FIG. 3 is a schematic structure view in one direction when a pluggable end 111 is aligned with a pluggable port of a Bluetooth® receiver for plugging according to the present invention.
Figure 4:
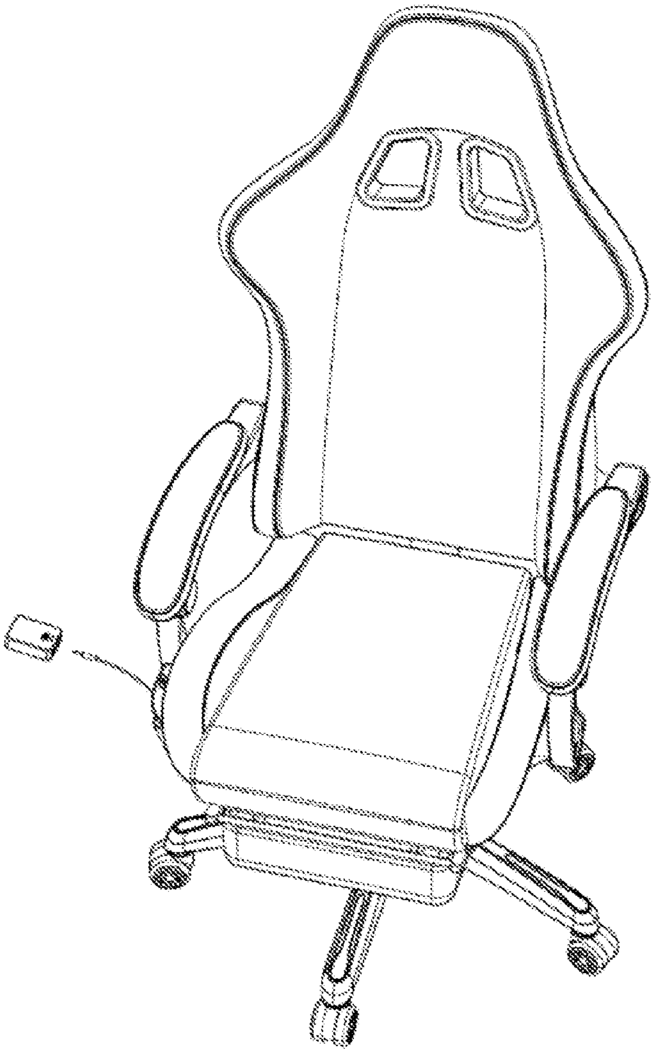
FIG. 4 is a schematic structure view in another direction when a pluggable end 111 is aligned with a pluggable port of a Bluetooth® receiver for plugging according to the present invention.
Figure 5:
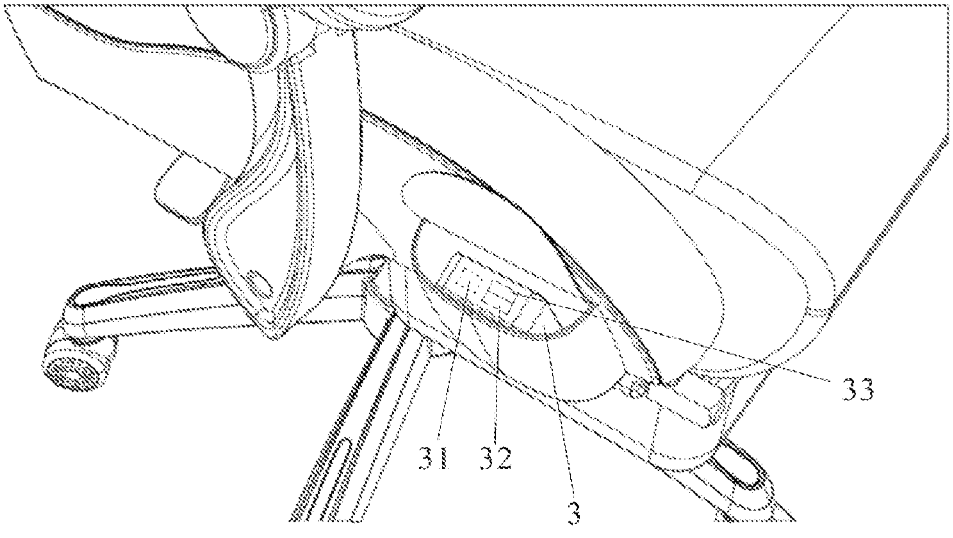
FIG. 5 is a schematic structural top view of a pocket when a flap is opened according to the present invention.

The present invention provides an acoustic seat. Referring to FIG. 1, the acoustic seat includes speaker 1, pocket 2, and Bluetooth® receiver 3. The speaker 1 is arranged on one side or two sides of an interior or an exterior of an upper end of backrest 101. In actual applications, the speaker 1 may be arranged in the backrest 101, and may also be directly exposed out. The specific arrangement is selected flexibly according to an actual application scene. Preferably, there are two speakers 1. The two speakers 1 are respectively arranged on the two sides of the upper end of the backrest 101. The speakers of the seat can be cooperated with a desktop speaker to form a stereo surround sound, thereby enhancing a stereo perception of a sound. The speakers 1 can be bonded or detachably mounted in the backrest 101.

In specific arrangement, an accommodating space for accommodating the speaker 1 may be formed in the backrest 101, and covered by a mesh cover. This can be aesthetically-pleasing, and can also ensure smooth transmission of the sound.

In the present invention, cushion side lug 1021 is arranged on a side of cushion 102. Pocket 2 is arranged on a side of a front end of the cushion side lug 1021. A side lug wiring channel is formed in the cushion side lug 1021. A backrest wiring channel is formed in the backrest 101. Pluggable end 111 of cable 11 from the speaker 1 is downward along the backrest wiring channel in the backrest 101 to enter the side lug wiring channel in the cushion side lug 1021. Through holes for allowing the pluggable end 111 to pass through are formed in an inner side of the pocket 2 and a side of the cushion side lug 1021, respectively. After passing through the side lug wiring channel, the pluggable end 111 extends into the pocket 2 through the through holes. It is to be noted that the cable 11 has a length margin, and is configured to be pulled out of the pocket 2 or hidden in the pocket 2, for ease of a plug operation.

The Bluetooth® receiver 3 has a pluggable port 32. The pluggable port is matched with the pluggable end 111. The Bluetooth® receiver 3 is pluggably connected to the pluggable end 111 through the pluggable port. The Bluetooth® receiver 3 can be placed in the pocket 2 or taken out of the pocket randomly for different operations. In actual applications, the Bluetooth® receiver 3 can be detached or mounted at any time.

A power battery 31 is provided in the Bluetooth® receiver 3. A charging port 33 is formed in the Bluetooth® receiver 3, and the charging port is electrically connected to the battery. The charging port serves as a charging structure. When the acoustic seat is used, a plug of a charging wire is inserted into the charging port for charging.

The cable 11 includes a first wire in the backrest 101 and a second wire in the cushion side lug 1021. The first wire and the second wire are connected by a connecting plug 112. The structure with the connecting plug 112 in the middle is convenient for assembly.

The pocket 2 is a flexible structure, so as to conveniently accommodate a part of the redundant cable 11 and the Bluetooth® receiver 3.

Specifically, the pocket 2 is provided with flap 21. One end of the flap 21 is connected to an inner side of a top of the pocket 2, and the other end of the flap 21 is configured to cover an opening of the pocket 2 and be connected to an outer side of the top of the pocket 2. The flap 21 may use a natural fastening structure, and may also use other structures. For example, the other end of the flap 21 is connected to the outer side of the top of the pocket 2 by a button, magnetic attraction, and the like. The magnetic attraction may be magnetic attraction between a magnet and a ferromagnetic item.

In actual applications, an inner side of the pocket 2 is attached to the side of the cushion side lug 1021 by a magnetic tape or sewing. The specific structure is designed flexibly according to an actual application scene.

The present invention has the following working principle:

Before the acoustic seat is used, the Bluetooth® receiver 3 can be fully charged through the charging port. The pluggable end 111 is pulled out of the pocket 2, and aligned with the pluggable port of the Bluetooth® receiver 3 for plugging. The cable 11 and the Bluetooth® receiver 3 are placed into the pocket 2, and the pocket is covered by the flap 21. An intelligent terminal is connected to the Bluetooth® receiver 3 for audio playing.

In the description of the present application, it needs to be understood the orientation or positional relationships indicated by terms, such as "up", "down", "front", "rear", "left", "right", "vertical", "horizontal", "top", "bottom", "inside", and "outside", are based on the orientation or positional relationship shown in the drawings, are merely for facilitating the description of the present application and simplifying the description, rather than indicating or implying that an apparatus or element referred to must have a particular orientation or be constructed and operated in a particular orientation, and therefore will not be interpreted as limiting the present application.

The particular embodiments of the present invention are described as above. It should be understood that the present invention is not limited to the above specific embodiments. Those skilled in the art can make various changes or modifications within the scope of the claims, which does not affect the essence of the present invention. The examples of the present invention and features in the examples may be arbitrarily combined with each other in a non-conflicting situation.

What is claimed is:

1. An acoustic seat, comprising:

a backrest;

a cushion side lug;

a speaker arranged on one side or two sides of an interior or an exterior of an upper end of the backrest;

a cable;

a pocket arranged on a side of a front end of the cushion side lug, wherein a pluggable end of the cable from the speaker is downward from the backrest, extends out of the cushion side lug and extends into the pocket; and a wireless receiver configured to receive and process wireless signals, wherein the wireless receiver is pluggably connected to the pluggable end and configured to be placed in the pocket or taken out of the pocket randomly for different operations, wherein the cable comprises a first wire in the backrest and a second wire in the cushion side lug, and an end the first wire and an end of the second wire are connected by a connecting plug disposed at an intersection of the backrest and the cushion side lug.

2. The acoustic seat according to claim 1, wherein a power battery is provided in the wireless receiver, the wireless receiver has a charging port, and the charging port is electrically connected to the power battery.

3. The acoustic seat according to claim 1, wherein the cable has a length margin, and the cable is configured to be pulled out of the pocket or hidden in the pocket.

4. The acoustic seat according to claim 1, wherein the pocket is provided with a flap; and a first end of the flap is connected to an inner side of a top of the pocket, and a second end of the flap is configured to cover an opening of the pocket and be connected to an outer side of the top of the pocket.

5. The acoustic seat according to claim 4, wherein the second end of the flap is connected to the outer side of the top of the pocket by a button or magnetic attraction.

6. The acoustic seat according to claim 1, wherein an inner side of the pocket is attached to a side of the cushion side lug by a magic tape or sewing.

7. The acoustic seat according to claim 1, wherein through holes for allowing the pluggable end to pass through are formed in an inner side of the pocket and a side of the cushion side lug, respectively.

8. The acoustic seat according to claim 1, wherein the speaker is bonded or detachably mounted in the backrest.

* * * * *